United States Patent
Boy et al.

(10) Patent No.: US 9,397,359 B2
(45) Date of Patent: Jul. 19, 2016

(54) METHOD FOR PREPARING A MATERIAL ON A SUBSTRATE BY SOL-GEL MEANS

(71) Applicant: COMMISSARIAT À L'ÉNERGIE ATOMIQUE ET AUX ÉNERGIES ALTERNATIVES, Paris (FR)

(72) Inventors: Philippe Boy, Joue les Tours (FR); Emilie Courtin, Tours (FR); Thierry Piquero, Fondettes (FR); Agnès Biller, Saint Avertin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 129 days.

(21) Appl. No.: 14/349,460

(22) PCT Filed: Oct. 5, 2012

(86) PCT No.: PCT/EP2012/069765
§ 371 (c)(1),
(2) Date: Apr. 3, 2014

(87) PCT Pub. No.: WO2013/050557
PCT Pub. Date: Apr. 11, 2013

(65) Prior Publication Data
US 2014/0302231 A1    Oct. 9, 2014

(30) Foreign Application Priority Data

Oct. 7, 2011 (FR) ...................... 11 59080

(51) Int. Cl.
| | |
|---|---|
| C04B 35/624 | (2006.01) |
| H01M 8/10 | (2016.01) |
| C04B 41/89 | (2006.01) |
| C04B 35/447 | (2006.01) |
| C04B 35/486 | (2006.01) |
| C04B 35/50 | (2006.01) |
| C04B 35/626 | (2006.01) |
| C04B 41/52 | (2006.01) |
| H01M 8/12 | (2016.01) |
| C04B 41/00 | (2006.01) |
| B82Y 30/00 | (2011.01) |
| C04B 111/00 | (2006.01) |

(52) U.S. Cl.
CPC ............ *H01M 8/1016* (2013.01); *B82Y 30/00* (2013.01); *C04B 35/447* (2013.01); *C04B 35/486* (2013.01); *C04B 35/50* (2013.01); *C04B 35/624* (2013.01); *C04B 35/6264* (2013.01); *C04B 41/009* (2013.01); *C04B 41/52* (2013.01); *C04B 41/89* (2013.01); *H01M 8/1246* (2013.01); *C04B 2111/00853* (2013.01); *C04B 2235/3224* (2013.01); *C04B 2235/3225* (2013.01); *C04B 2235/3229* (2013.01); *C04B 2235/3246* (2013.01); *C04B 2235/441* (2013.01); *C04B 2235/443* (2013.01); *C04B 2235/444* (2013.01); *C04B 2235/5454* (2013.01); *C04B 2235/6562* (2013.01); *C04B 2235/6565* (2013.01); *C04B 2235/6567* (2013.01); *Y02E 60/521* (2013.01); *Y02E 60/525* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 5,585,136 | A  * | 12/1996 | Barrow | ............ C04B 35/62218 427/2.24 |
| 2002/0192511 | A1* | 12/2002 | Hruschka | ................ C04B 28/34 428/704 |
| 2007/0098905 | A1 | 5/2007 | Gaudon et al. | |
| 2007/0180689 | A1* | 8/2007 | Day | ...................... C04B 35/486 29/623.5 |
| 2008/0175985 | A1 | 7/2008 | Belleville et al. | |
| 2008/0182128 | A1 | 7/2008 | Boy et al. | |
| 2008/0292790 | A1 | 11/2008 | Lebrette et al. | |

FOREIGN PATENT DOCUMENTS

FR    2856397 A1    12/2004

OTHER PUBLICATIONS

Rose et al., Application of sol gel spin coated yttria-stabilized zirconia layers for the improvement of solid oxide fuel cell electrolytes produced by atmospheric plasma spraying, 2007, J. Power Sources 167, pp. 340-348.*

Perednis et al., Morphology and deposition of thin yttria-stabilized zirconia films using spray pyrolysis, 2007, Thin Solid Films 474, pp. 84-95.*

(Continued)

*Primary Examiner* — Robert Vetere
(74) *Attorney, Agent, or Firm* — Hultquist, PLLC; Mary B. Grant

(57) ABSTRACT

The invention relates to a method for preparing a material based on metal element(s) oxide(s) on a substrate, comprising the following successive steps:

a) depositing, by liquid means, on at least one face of this substrate, at least one layer of a sol-gel precursor solution of the constituent metal element(s) oxide(s) of said material;

b) depositing, by liquid means, on said layer deposited in a), at least one layer of a dispersion comprising a powder of metal element(s) oxide(s) and a sol-gel solution identical to or different from that used in step a), said solution being a precursor of the constituent metal element(s) oxide(s) of said material and the powder consisting of constituent metal element(s) oxide(s) of said material;

c) heat treating said layers deposited in a) and b) in order to transform them into said material.

23 Claims, No Drawings

(56) References Cited

OTHER PUBLICATIONS

Patil et al., Morphology and deposition of thin yttria-stabilized zirconia films using spray pyrolysis, 2008, Ceram. Int'l 34, pp. 1195-1199.*

Bardaine, A., et al., "Influence of powder preparation process on piezoelectric properties of PZT sol-gel composite thick films", "J Sol-Gel Sci Technol", Jul. 25, 2008, pp. 135-142, vol. 48, No. 1.

Dauchy, F., et al., "Patterned crack-free PZT thick films for microelectromechanical system applications", "Int J Adv Manuf Technol", Mar. 16, 2007, pp. 86-94, vol. 33.

Lenormand, P., et al., "Thick films of YSZ electrolytes by dip-coating process", "Journal of the European Ceramic Society", Apr. 6, 2005, pp. 2643-2646, vol. 25.

Patil, D., et al., "Eight mole percent yttria stabilized zirconia powders by organic precursor route", "Ceramics International", Apr. 8, 2007, pp. 1195-1199, vol. 34.

Rose, L., et al., "Application of sol gel spin coated yttria-stabilized zirconia layers for the improvement of solid oxide fuel cell electrolytes produced by atmospheric plasma spraying", "Journal of Power Sources", Feb. 6, 2007, pp. 340-348, vol. 167.

Viazzi, C., et al., "The solgel route: A versatile process for up-scaling the fabrication of gas-tight thin electrolyte layers", "Journal of Power Sources", Nov. 26, 2010, pp. 2987-2993, vol. 196.

* cited by examiner

METHOD FOR PREPARING A MATERIAL ON A SUBSTRATE BY SOL-GEL MEANS

CROSS-REFERENCE TO RELATED APPLICATIONS

This application is a U.S. national phase under the provisions of 35 U.S.C. §371 of International Patent Application No. PCT/EP12/69765 filed Oct. 5, 2012, which in turn claims priority of French Patent Application No. 1159080 filed Oct. 7, 2011. The disclosures of such international patent application and French priority patent application are hereby incorporated herein by reference in their respective entireties, for all purposes.

TECHNICAL FIELD

The present invention relates to a method for preparing a material based on oxide(s) of metal element(s) on a substrate by sol-gel means, such as materials based on oxide(s) of transition metals and/or lanthanide(s) such as materials based on oxide(s) selected from cerium and gadolinium oxide, cerium oxide, zirconia doped with yttrium (entitled YSZ), zirconia doped with scandium (entitled ScSZ), apatite oxides.

The technique field of the invention may be defined, generally speaking, as that of the preparation of ceramic materials, in particular the preparation of materials being in the form of films of metal element(s) oxide(s) on substrates, particularly potentially porous ceramic substrates.

The invention applies in particular to the preparation of dense electrolytic materials, of low thickness, of mixed oxide type, such as materials made of zirconia doped with yttrium (designated hereafter YSZ), which can in particular be used for their high ionic conductivity and their high chemical and mechanical stability in SOFC (Solid Oxide Fuel Cells) or instead electrolysers operating at high temperature (particularly at temperatures above 800° C.)

STATE OF THE PRIOR ART

The preparation of materials based on metal element(s) oxide(s) may be carried out by methods that can be grouped together into two categories: on the one hand methods by dry means and, on the other hand, methods by wet means.

The category of methods by dry means may be broken down into several sub-categories: vapour phase, plasma phase and solid phase methods.

For methods bringing into play a vapour phase, the method the most commonly used is evaporation, in which the metal element(s) oxide(s) to be deposited are placed in a crucible heated to a sufficient temperature so that vapours form and condense in the form of a coating, or layer, on a cooled substrate.

For methods taking place in plasma phase, cathodic sputtering may be cited. This technique implements a bombardment of the metal element(s) oxide(s) to be deposited, by ions generated by a plasma. The transfer of the kinetic energy of these ions to the atoms of the oxides to be deposited brings about the projection at high speed of these atoms onto the substrate to be coated, enabling a deposition in the form of a coating or layer.

As regards methods bringing into play a solid phase, the decomposition of organometallic compounds may be cited, which consists in the thermal decomposition of these compounds at a sufficient temperature to produce an elimination of the organic products formed during said decomposition, and a ceramisation.

These vapour phase, plasma phase and solid phase methods nevertheless require the implementation of very high temperatures (generally above 1000° C.) and the use of refractory equipment.

Methods of manufacturing materials of the aforementioned type by liquid means, in particular the tape casting method, the serigraphy method and the sol-gel method, make it possible to circumvent these drawbacks.

The tape casting method involves suspending ceramic powders in a generally non-aqueous medium and which can comprise numerous additives, such as organic binders or dispersing agents, respectively assuring cohesion and stability of the suspension. The assembly constituted of the suspension and additives, also known as tape casting "slurry", is then deposited on a surface and leveled out using a doctor blade.

This method has nevertheless several difficulties linked to the thickness of the ceramic layers obtained. In fact, this technique of coating substrates does not make it possible to obtain layers of thickness below ten or so μm, necessary for example for the conception of SOFC electrolytes which can be used at more moderate operating temperatures (700-800° C.). Furthermore, this method does not adapt itself well to substrates of complex geometry.

The serigraphy method, for its part, consists in preparing an ink and depositing the latter on a support, said method having the following drawbacks:
  the ink may have a too high viscosity to be able to be deposited by deposition techniques such as dip coating;
  it is not very well adapted to the formation of layer(s) on complex surfaces.

The sol-gel method consists, conventionally, for its part, in the prior preparation of a solution containing precursors of ceramic oxides in the molecular state (organometallic compounds, metal salts), thereby forming a sol (also known as sol-gel solution). Secondly, said sol is deposited, in the form of a film, on a substrate. In contact with ambient humidity, the precursors hydrolyse and condense, thereby forming an oxide network entrapping the solvent and ending up with a gel. The film forming gel layer is then subjected to a step of heat treatment, so as to form a ceramic film.

The sol-gel method has appreciable advantages compared to the methods explained previously:
  it enables the formation of coatings on surfaces of complex geometry;
  it enables depositions homogeneous in thickness and in composition to be obtained;
  since the mixing of species takes place at the molecular scale, this method makes it possible to prepare complex oxides comprising, for example, three elements or more.

A particularly advantageous deposition technique for sols is the technique known as dip coating, a technique that can be broken down into four steps: the immersion of the substrate in the sol, the removal of the substrate from the sol with a controlled speed leaving subsisting on the substrate a sol layer, the flow of the sol from the substrate, and finally, the evaporation of the solvent.

Nevertheless, the deposition of layers by sol-gel method implemented particularly by the dip coating technique makes it difficult to obtain thicknesses greater than one micrometre. Said method leads in general to maximum monolayer thicknesses of 250 nm, making it impossible to obtain layers of oxide of greater thickness without carrying out several successive depositions.

Another drawback of sol-gel methods resides in the difficulty of depositing dense, homogeneous thin layers, and of sufficient thickness on a porous substrate, such as NiO-YSZ, which is the anode material of currently marketed SOFC. In the case where these substrates have an open porosity, an infiltration of the sol by capillarity into the pores of the substrate is generally observed during the deposition.

With the aim of overcoming the aforementioned drawbacks, in other words carrying out the deposition of layers of oxide(s) of thickness greater than a micrometre, while avoiding a penetration of the sol-gel solution within the porous substrate, certain authors have proposed the use, as deposition solution, of a dispersion comprising as continuous dispersion medium a sol-gel precursor solution of a ceramic oxide, and as dispersed phase, the association of a powder of said ceramic oxide and a polymeric matrix acting as cohesion agent of said sol-gel solution.

Thus, Gaudon et al. in the document FR 2 856 397 [1], describe a method for preparing a coating based on zirconia doped with yttrium (YSZ) having a thickness greater than or equal to 40 µm. This method successively comprises:
- the preparation, in a first step, of a sol-gel solution comprising a powder of metal element oxide (typically, the oxide YSZ) and a dispersant (typically, an organic compound of phosphate-ester type) in liquid medium (typically, a mixture of ethanol/methyl ethyl ketone solvents in the proportions 60/40 by volume);
- the addition to said sol-gel solution, in a second step, of a solution of at least one organic cohesion agent (typically, the agent obtained by polymerisation reaction between hexamethylenetetramine (entitled HMTA) and acetylacetone (entitled acac)) in a solvent (typically, acetic acid), leading to a dispersion (which may be qualified by the term "composite");
- the deposition of a layer of said dispersion on a substrate of Ni-YSZ type by dip coating technique, followed by a step of drying and an appropriate heat treatment.

The use of such dispersions of composite nature is also illustrated in the literature for the deposition of thick layers (of thickness well above a micrometre, typically greater than 20 µm) by dip coating technique. For example, the authors Lenormand et al. in "Journal of the European Ceramic Society", 25 (2005), pages 2643-2646 [2] may be cited, who describe the carrying out of depositions of ceramic YSZ layers of thickness comprised between 10 and 25 µm. Even more recently, the authors Viazzi et al. in "Journal of Power Sources", 196 (2011), pages 2987-2993 [3], carried out depositions of layers of thickness comprised between 25 and 45 µm by implementing this same dip coating technique.

The following drawbacks emerge from preparation methods of the prior art:
- obtaining materials based on oxide(s), which may not adhere sufficiently to the substrate, on which they are deposited;
- obtaining materials based on oxide(s), which have inhomogeneous properties, when they are deposited on an inappropriate substrate (which is the case of substrates with open porosity);
- obtaining materials, which have an insufficient density, particularly if they are intended to be used as electrolytes;
- a complex implementation: for example, the addition of an organic cohesion agent, or instead the use of different solvents for dissolving said cohesion agent and for forming the dispersion.

The inventors have thus set themselves the objective of providing a method for preparing a material based on oxide(s) of metal element(s) on a substrate not having the drawbacks of the methods of the prior art and, particularly the aforementioned drawbacks.

DESCRIPTION OF THE INVENTION

The inventors have attained the objective that they set themselves by the present invention, which relates to a method of preparing a material based on oxide(s) of metal element(s) on a substrate, comprising the following successive steps:

a) depositing, by liquid means, on at least one face of said substrate, at least one layer of a sol-gel precursor solution of the constituent metal element(s) oxide(s) of said material;

b) depositing, by liquid means, on said layer deposited in a), at least one layer of a dispersion comprising a powder of metal element(s) oxide(s) and a sol-gel solution identical to or different from that used in step a), said solution being a precursor of the constituent metal element(s) oxide(s) of said material and the powder consisting of the constituent metal element(s) oxide(s) of said material;

c) heat treating said layers deposited in a) and b) in order to transform them into said material.

The method of the invention makes it possible to overcome a certain number of drawbacks of the methods of the prior art, and particularly those stemming from the documents [1], [2] and [3] mentioned above. In fact, the layer deposited in a) (also known as primer layer) makes it possible to obtain a prior planarization of the substrate before the implementation of step b), thereby enabling the use of substrates of non-homogeneous surface, for example those having an open porosity. Said substrate thus has a homogeneous surface, and the adherence of said dispersion to the substrate is considerably improved through the intermediary of this primer layer.

According to the invention, the method comprises, as mentioned above, a first step a) of depositing, by liquid means, on at least one face of said substrate, at least one layer of a sol-gel precursor solution of the constituent metal element(s) oxide(s) of said material.

The substrate used within the scope of the method of the invention may be of different types and may be, in particular, a substrate based on metal element(s) oxide(s), more specifically oxide(s) of transition metals and/or lanthanide(s).

A particular substrate meeting these specificities is a substrate comprising a zirconia doped with yttrium (YSZ), potentially mixed with nickel oxide NiO.

In particular, the substrate may be made of one or more oxide(s) of metal element(s) of composition identical to the material prepared according to the invention.

Advantageously, the substrate may consist of a substrate composed of non-sintered powder(s) of metal element(s) oxide(s), in other words a substrate that has not undergone a prior sintering step, i.e., in other words, according to the invention, which has not undergone a step of heat treatment at a temperature above 200° C. It may be in particular a substrate having been obtained from an ink (which is the case of substrates obtained by serigraphy) or from a slurry (which is the case of substrates obtained by a tape casting method).

When, at the end of the method, the assembly constituted of the substrate and material is intended to constitute an electrode-electrolyte assembly, the substrate may comprise, on one of these faces (more specifically that intended to serve as base for the implementation of steps a) and b) of the method), a layer made of metal element(s) oxide(s), able to assure the role of catalyst of the desired electrochemical reaction, said layer thereby fulfilling the role of active layer. In particular, when the assembly is intended to enter into the constitution of a SOFC fuel cell, the active layer may be made of a metal element oxide able to fulfil the role of hydrogen oxidation or reduction catalyst. A metal element oxide particularly suited to fulfil this role is nickel oxide(II) mixed with a zirconia doped with yttrium (entitled YSZ).

Whether for the implementation of steps a) or b), it is possible to envisage, among the techniques of deposition by liquid means:
- dip coating;
- spin coating;
- laminar flow coating or meniscus coating;
- spray coating;
- doctor blade coating.

The most advantageous technique, among the techniques of deposition by liquid means cited above, is the dip coating technique, which enables excellent results to be obtained, and which makes it possible in particular to carry out depositions on substrates having complex geometry and not necessarily flat.

Said sol-gel solution, which is deposited in the form of a primer layer on the substrate at the end of step a), is advantageously a precursor of metal element(s) oxide(s), in particular oxide(s) of transition metals and/or lanthanide(s), such as oxides selected from cerium and gadolinium oxide (entitled CGO), cerium oxide ($CeO_2$), zirconia doped with yttrium (entitled YSZ), zirconia doped with scandium (entitled ScSZ), apatite oxides. In an even more advantageous manner, said sol-gel solution is a precursor of the ceramic YSZ.

Said sol-gel solution used within the scope of step a) may be a sol-gel solution of the colloidal type, in other words a solution comprising hydrolysed species, precursors of metal element(s) oxide(s), which are partially or totally condensed. In the event where said species are partially condensed, they are referred to as clusters or oligomers and in the case where said species are totally condensed, they are referred to as crystallised nanoparticles. On the other hand, the sol-gel solution used within the scope of step a) is not, advantageously, a composite solution, in other words a sol-gel solution to which a powder has been added.

The sol-gel solution may be prepared prior to the step of deposition a), and in particular may be prepared from metal molecular precursors added to a medium comprising an organic or aqueous solvent and potentially other additives, such as stabilising agents such as acetylacetone. These metallic molecular precursors comprise the metal elements that are intended to enter into the composition of the constituent ceramic oxide of the material. Said precursors may be metal alkoxides or metal salts. The medium comprising an organic solvent is generally an alcoholic medium (for example, a medium comprising ethanol and/or propanol), the function of said medium being to solubilise the molecular precursors. The medium may also be an aqueous medium.

When it involves preparing a sol-gel precursor solution of an oxide of metal element(s) of the YSZ type, different embodiments may be envisaged.

According to a first particular embodiment, a sol-gel solution may be prepared by placing in contact molecular precursors based on yttrium and zirconium with at least one alcoholic solvent. Preferably, said alcoholic solvent is an aliphatic alcohol, comprising 2 to 3 carbon atoms. As an example, ethanol and n-propanol may be cited.

The yttrium and zirconium based molecular precursors may be selected from organometallic compounds of zirconium such as alcoholates comprising a number of carbon atoms ranging from 1 to 4. For example, the zirconium based molecular precursor used may be zirconium iso-propoxide (noted $Zr(Oi-Pr)_4$). The yttrium based molecular precursor may be selected from yttrium mineral salts. For example, a precursor of this type may be hexahydrated yttrium nitrate.

As an example, when the metal precursors selected are zirconium iso-propoxide and hexahydrated yttrium nitrate, the sol-gel solution may be prepared according to a protocol comprising the following succession of steps:
- the placing in contact zirconium iso-propoxide, potentially in solution, with an organic solvent as explained previously, at a fixed concentration;
- the addition of an organic compound making it possible to limit subsequently the hydrolysis reaction of the zirconium precursor, said compound being, preferably, a stabilising agent such as acetylacetone (symbolised hereafter by "acac");
- the addition of hexahydrated yttrium nitrate, potentially in solution in an organic solvent, the quantity of which is adjusted to the composition of the sol-gel solution in zirconium and yttrium; the composition of the sol-gel solution obtained is, for example, $ZrO_2$-8 mol % $Y_2O_3$;
- the addition of a mixture of water and a mineral acid, such as hydrochloric acid, in order to initiate the hydrolysis and condensation reactions of said precursors.

As an example, the following experimental parameters: ratio of hydrolysis $h=[H_2O]/[Zr(Oi-Pr)_4]$, ratio of complexation $x=[acac]/[Zr(Oi-Pr)_4]$ and acidity ratio $h^+=[H^+]/[Zr(Oi-Pr)_4]$ are predetermined. In particular, h may have a value below 10, particularly with a view to obtaining a sol-gel solution comprising molecular species of size ranging from 1 to 4 nm.

The sol-gel solution obtained at the end of these steps may be made to undergo a step known as maturation. This step consists in placing under stirring, as explained previously, said sol-gel solution, for a sufficient duration until a sol-gel solution having a constant viscosity as a function of time is obtained, this duration being able to be one week. At the end of this maturation step, the sol-gel solution may be conserved without degradation for several months.

Once the stabilisation of the viscosity of the sol-gel solution has been observed, said sol-gel solution may be made to undergo a dilution step making it possible to achieve lower concentrations of the sol-gel solution previously prepared, which facilitates in particular the subsequent use of said sol-gel solution. This dilution, at a determined ratio, makes it possible on the one hand to adjust the viscosity to a given value and, on the other hand, to use said sol-gel solution to carry out, particularly, depositions of said sol-gel solution in the form of layers.

The dilution solvent must be, preferably, compatible with the solvent for preparing the concentrated sol-gel solution. Preferably, it may be identical to the preparation solvent of said sol-gel solution.

According to a second particular embodiment, a sol-gel solution based on yttrium and zirconium is prepared in an aqueous solvent, by placing in contact yttrium and zirconium based molecular precursors in said aqueous solvent. Preferably, said aqueous solvent is water.

The yttrium and zirconium based molecular precursors implemented for the preparation of the sol-gel solution in aqueous medium may be selected in the following manner. The zirconium based molecular precursors may be selected from zirconium mineral salts. For example, a zirconium based molecular precursor used is a zirconium mineral salt such as octahydrated zirconium oxychloride (noted $ZrOCl_2.8H_2O$). The yttrium based molecular precursors may be selected from yttrium mineral salts. For example, a yttrium based molecular precursor used is a yttrium mineral salt such as hexahydrated yttrium chloride (noted $YCl_3.6H_2O$).

As an example, when the metallic precursors chosen are octahydrated zirconium oxychloride and hexahydrated yttrium chloride, the sol-gel solution may be prepared according to a protocol comprising the following succession of steps:

- the placing in contact of said precursors in water, precursors in which the quantities are fixed so as to obtain a $[YCl_3.6H_2O]/[ZrOCl_2.8H_2O]$ ratio of predetermined value;
- the addition of an organic compound making it possible to favour the precipitation of YSZ particles, preferably a compound such as urea, in a quantity so as to obtain a $[urea]/[ZrOCl_2.8H_2O]$ ratio of predetermined value;
- a heat treatment at a fixed temperature and a fixed pressure, over a fixed period;
- a physical-chemical treatment of the precipitate obtained, which can comprise steps including centrifugation, dialysis; and
- dispersing the precipitate thereby treated in water, followed potentially by a peptisation treatment (for example, by addition of acid) and/or a sonification treatment.

At the end of these steps a solution is obtained, said solution comprising crystallised nanoparticles having an average diameter ranging from 5 to 10 nm (measured by laser granulometry) and being able to comprise very high concentrations of nanoparticles (for example, of the order of 50%) without forming a gel.

Once step a) has been carried out, the method of the invention comprises a step b) of deposition, by liquid means, on said layer deposited in a), of at least one layer of a dispersion comprising a powder of oxide(s) of metal element(s) and a sol-gel solution identical to or different from that used in step a), said solution being a precursor of the constituent metal element(s) oxide(s) of said material and the powder consisting of the constituent metal element(s) oxide(s) of said material.

This deposition is carried out by liquid means, such as spin coating, laminar flow coating, dip coating, spray coating, doctor blade coating, preferably by dip coating. This deposition operation may be repeated one or more times so as to obtain a stack of layers having the desired thickness.

In the same way as for the step of deposition a), the step of deposition b) is implemented, advantageously, by dip coating.

The sol-gel solution, constituting the base of the dispersion applied on the substrate in step b) of the method according to the invention, may be of identical composition to that applied as primer layer on the substrate in step a) of said method.

By using a same sol-gel solution throughout the method of the invention, this makes it possible to reduce the number of compounds required for the preparation of the solutions implemented in said steps a) and b) for the coating of said substrate, and particularly to avoid the introduction of a polymer matrix that plays the role of primer layer which has the objective, as suggested by the documents [1], [2] and [3] of the prior art cited previously, of assuring better adherence of the dispersion containing the metal oxide(s).

The powders used in the scope of this step may have, advantageously, an average diameter of particles ranging from 1 to 150 nm.

The powders used in the scope of this step may be of identical composition to that of the metal element(s) oxide(s) that will result from the heat treatment of the sol-gel solution in which the powder is dispersed.

The powder may be incorporated in the sol-gel solution at a content that can be easily chosen by those skilled in the art as a function of the desired thickness of the dispersion layer.

The aforementioned dispersion may be prepared prior to the step of deposition b).

Said dispersion deposited in the form of at least one layer on the substrate is conventionally obtained by dispersing a powder of oxide(s) of metal oxide(s) in a sol-gel precursor solution of metal element(s) oxide(s), the powder thereby constituting the dispersion phase, whereas the sol-gel solution constitutes the continuous medium of the dispersion.

To this dispersion may be added chemical agents for adjusting the viscosity of said dispersion, and chemical agents making it possible to avoid an agglomeration of said powder in said dispersion. In this case, these agents are introduced directly into the dispersion, without prior dissolution in a solvent for dispersing said agents, as suggested by the document [1] of the prior art cited above, which makes it possible to reduce the number of chemical constituents necessary for the preparation of said dispersion.

The powder is a powder that may be available commercially or instead which may be prepared beforehand.

Thus, the powder of metal element(s) oxide(s) may be prepared by conventional means of preparing powders, among which may be cited preparation by metallurgy of powders, by liquid means, such as the sol-gel technique explained previously.

As an example, said powder is prepared from the sol-gel solution in which the powder is dispersed later to constitute the dispersion, after drying, calcination and grinding of said sol-gel solution according to a conventional protocol easily determinable by those skilled in the art.

The precursor solution of metal element(s) oxide(s) in which the powder is dispersed, and also being able to serve as base for the preparation of the powders, is obtained, as its name indicates, by the sol-gel technique, more specifically by solubilisation or dissolution in a medium, organic or aqueous, of one or more molecular precursors, for example as has been defined for step a) for the first and second embodiments (particularly when there is identity of composition between the sol-gel solution of step a) and the sol-gel solution of step b)).

Said sol-gel solution may be prepared in an organic or aqueous medium, for example as is explained above for the preparation of the sol-gel solution of step a) according to the first and second embodiments.

When the sol-gel solution is prepared, in organic medium, typically, in an organic alcoholic solvent selected preferably from ethanol and n-propanol, the sol-gel solution may be present, in the dispersion formed in step b), at a concentration of 0.1 to 0.3 mole per litre of said organic solvent. According to this same embodiment, the powder may be incorporated in the sol-gel solution at a content ranging from 50 to 60% by mass of the total mass of the dispersion.

When the sol-gel solution is prepared, in aqueous medium, typically, in an aqueous solvent, the powder may be incorporated in the sol-gel solution at a content so as to obtain a volume ratio between the powder and the nanoparticles (contained in the sol-gel solution) comprised between 85/15 and 95/5.

The powder, particularly when it is a powder of the YSZ type, and when it is not commercially available, may be prepared from a sol-gel solution, the preparation of which is explained previously. To attain a powder from such a sol-gel solution, the steps are as explained above, namely:

- a step of gelling by hydrolysis of the sol-gel solution;
- a step of drying, at the end of which a xerogel is obtained;
- a step of heat treatment, to obtain a crystallisation of said xerogel.

Whatever the nature of the medium (organic or aqueous) in which the sol-gel solution is formed, the preparation of the dispersion used in step b) of the method according to the invention, when it involves preparing a material of YSZ type, may be carried out in said sol-gel solution according to a protocol comprising the following successive steps:

- the addition to said sol-gel solution, in a direct manner and without prior dispersion in another solvent, of a commercially available powder; for example, a YSZ powder having a composition $ZrO_2$-8 mol % $Y_2O_3$;
- the addition of a chemical agent, preferably ethylene glycol, which makes it possible to adjust the viscosity of said dispersion, in predetermined quantity;
- the addition of a chemical agent, preferably the polyether derivative of formula (I), the semi-developed formula of which is represented below (n=9-10),

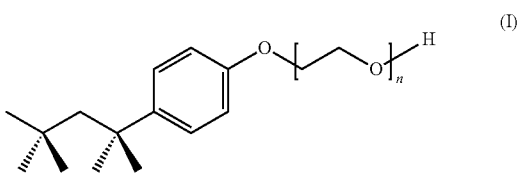

as anti-agglomerating agent of the YSZ powder in solution;
- a step of maturation, during which the dispersion is placed under stirring, as explained previously, for a predetermined time, until a dispersion having a constant viscosity as a function of time is obtained; preferably, said viscosity may be comprised between 1 and 40 cP. The dispersion obtained is, preferably, left under stirring for a period of 3 weeks.

The assembly constituted of the substrate and the layers deposited beforehand is then heat treated, (step c) so as to transform the sol-gel precursor solution deposited in a) and the dispersion deposited in b) into said desired material based on metal element oxide(s).

This heat treatment may comprise:
- a step of drying the layers at an appropriate temperature to obtain a gelling thereof, said temperature being generally below 100° C.;
- a step of calcination at a suitable temperature to obtain a crystallisation of the layers deposited in a material based on metal element(s) oxide(s), said temperature generally being above 150° C.;
- a step of sintering at an appropriate temperature to obtain a densification of the material, said temperature generally being above 1200° C.

The drying step is intended to assure a gelling of said deposited layers. More specifically, this step is intended to assure the evaporation of a part of the solvent used in the preparation of the sol-gel solution serving as continuous dispersion medium, said solvent being able to be of aqueous (preferably, water) or organic (preferably, ethanol or n-propanol) nature depending on the envisaged preparation means. The efficient temperature and efficient duration to assure drying may be easily determined by those skilled in the art using, for example, IR spectrophotometry. According to this particularly advantageous embodiment of the invention, the drying step may be carried out at ambient temperature, for a duration that extends from 30 seconds to around 30 minutes.

Once gelled, the layers undergo a calcination treatment carried out at an appropriate temperature and appropriate duration to eliminate the organic products resulting from condensation reactions during the formation of the gel. The calcination temperature is chosen so as to enable the elimination of organic compounds from the deposited layer and, in particular, the solvent for preparing and diluting the sol-gel solution and the organic compounds generated by the reaction of the molecular precursors together. An appropriate temperature is a temperature for which layers having an infrared spectrum no longer exhibiting absorption bands of carbon containing species are obtained. According to this particularly advantageous embodiment of the invention, the calcination step may be carried out according to a temperature cycle comprising a temperature being able to go up to 700° C. for a duration ranging from 1 minute to 2 hours.

Finally, the layers once calcinated are made to undergo a sintering step. The aim of this step is to enable a dense crystalline material to be obtained. The temperature and the duration of the sintering are chosen so as to obtain said crystallisation, easily verifiable by structural analysis, such as X-ray diffraction analysis.

When it involves preparing a material of YSZ type, in particular from sol-gel solutions and dispersions of the embodiments described above, the sintering may be carried out, under load of yttriated zirconia 8YSZ foams, according to a protocol comprising the following successive steps:
- starting from a temperature of 150° C., a temperature gradient of 120° C./h until the temperature of 700° C. is reached;
- a treatment at 700° C. for 2 hours;
- a temperature gradient of 120° C./h until the temperature of 1400° C. is reached;
- a treatment at 1400° C. for 10 hours;
- and a temperature gradient of −120° C./h until ambient temperature is reached.

Thus, thanks to the method of the invention applied to YSZ, involving a reduced number of steps compared to the prior art, and implementing a stable sol-gel solution and a dispersion using as preparation base said sol-gel solution, it has been possible to achieve the preparation of a material based on metal element(s) oxide(s) on a substrate, said material having both properties of density and homogeneity and which is able to be in the form of a film of 1 to 20 µm thickness, preferably 5 to 20 µm.

The assembly obtained according to the invention may constitute an electrolyte-electrode assembly, in which:
- the electrolyte is constituted of the layers deposited according to the method of the invention and heat treated, said electrolyte being able to have a thickness ranging from 5 to 20 µm;
- the electrode is constituted of the substrate, for example, a NiO-YSZ substrate.

A current collector layer may be provided on said electrode, which will be deposited on the face opposite to that which has served as deposition base for the layers of the method of the invention, said current collector layer being able to be a layer made of nickel oxide NiO deposited by serigraphy.

This assembly, which may be used in particular in SOFC type cells or instead in electrolysers at high temperature, may have the following performances:
- an excellent leak tightness on surfaces greater than 10 $cm^2$, in other words a voltage in open circuit of the order of 1.2 V;
- an electrical power greater than 200 $mW/cm^2$ at 850° C.

The invention will now be described with respect to two particular examples of implementation of the invention, given by way of illustration and non-limiting.

DETAILED DESCRIPTION OF PARTICULAR EMBODIMENTS

Example 1

This example illustrates the preparation of a material based on metal element(s) oxide(s) on a NiO-YSZ substrate according to the method of the invention. To do so, the following steps are performed:
- the preparation, in organic medium (n-propanol) of a sol-gel precursor solution of a ceramic of composition $ZrO_2$-8 mol % $Y_2O_3$ (sub-section 1.1);
- the preparation of a dispersion comprising a commercially available ceramic powder of composition $ZrO_2$-8 mol % $Y_2O_3$, and a sol-gel solution as defined above (sub-section 1.2);
- the successive depositions of said sol-gel solution and of said dispersion on the substrate followed by a heat treatment (sub-section 1.3).

1.1. Preparation of a Sol-Gel Precursor Solution of a Ceramic Oxide YSZ of Composition $ZrO_2$-8 mol % $Y_2O_3$.

In this part, the preparation of a precursor solution of YSZ ceramic of composition $ZrO_2$-8 mol % $Y_2O_3$ in n-propanol, from a zirconium precursor, introduced in the form of an alkoxide, and from a yttrium precursor, introduced in the form of a nitrate, is illustrated.

The zirconium alkoxide used is commercially available zirconium iso-propoxide at a concentration of 70% by mass in n-propanol (supplied by Aldrich). The yttrium nitrate is in the form of hexahydrate (99.8%, supplied by Aldrich).

Zirconium iso-propoxide (symbolised hereafter $Zr(Oi-Pr)_4$) at 70% in solution in n-propanol (18.9 mL) is dissolved in n-propanol (125 mL), so as to obtain a concentration of this solution in zirconium iso-propoxide of 0.2 M.

Acetylacetone (symbolised hereafter acac) (98%, supplied by Fluka) (3.4 g) is added before hydrolysis to limit the strong reactivity between the iso-propoxide precursor and water. A slightly exothermic reaction giving a yellow coloration to the solution is observed, following the reaction between acetylacetone and zirconium iso-propoxide.

Hexahydrated yttrium nitrate (symbolised hereafter $Y(NO_3)_3 \cdot 6H_2O$) (2.8 g) in n-propanol (50 mL) is added, so as to obtain a solution of composition $ZrO_2$-8% mol $Y_2O_3$, followed by the introduction of a mixture of deionised water (1.4 mL) and 37% hydrochloric acid in aqueous solution (0.1 mL) to initiate hydrolysis and condensation.

In this embodiment example, the sol-gel solution obtained, of composition $ZrO_2$-8 mol % $Y_2O_2$, is maintained under stirring for a day at ambient temperature.

According to this particular embodiment, the parameters of ratio of hydrolysis $h=[H_2O]/[Zr(Oi-Pr)_4]$, ratio of complexation $x=[acac]/[Zr(Oi-Pr)_4]$ and acidity ratio $h^+=[H^+]/[Zr(Oi-Pr)_4]$ take respectively the following values: $h=2.8$; $x=0.8$; $h^+=0.8$.

1.2. Preparation of the Dispersion in n-Propanol.

In this part, the preparation in organic medium of the aforementioned dispersion is illustrated.

To the sol-gel solution prepared according to 1.1 (140 g) is added a commercially available ceramic powder of composition $ZrO_2$-8 mol % $Y_2O_2$ (supplied by Tosoh under the denomination TS-8YS) (180 g), whereupon the dispersion obtained comprises 56% by mass of commercially available powder and 44% by mass of sol-gel solution.

Ethylene glycol (ethane-1,2-diol) (supplied by Sigma-Aldrich) (5% by mass of the dispersion) (14.4 mL) is added to the dispersion to adjust the viscosity of the mixture. A polyether derivative of formula (I) explained previously (Triton® X-100, 0.5% by mass of the dispersion) (supplied by Sigma-Aldrich) (1.6 g), is then added to the mixture to avoid the agglomeration of the different constituents of the mixture.

The dispersion obtained is then placed under stirring at ambient temperature.

In parallel, the preparation of a dispersion comprising 51% by mass of commercially available powder and 49% by mass of sol-gel solution is carried out.

1.3. Successive Depositions of the Sol-Gel Solution and of the Dispersion Prepared in n-Propanol and Heat Treatment.

In this part are illustrated the steps of deposition on a YSZ-NiO support (supplied by HC-Starck) of the sol-gel solution and of the dispersion prepared in n-propanol, according to the protocols of the sub-sections 1.1. and 1.2.

Prior steps of preparing said support have been carried out. To this end, firstly a layer of NiO-YSZ of 10 µm thickness is applied, from an ink, by serigraphy on a first face of said support, said layer having the function of fulfilling the role of electrode active layer.

The serigraphy inks are prepared, in a terpineol based medium (30% by mass), from a mixture of commercially available powder (70% by mass) of YSZ and NiO (respectively 65% NiO-35% YSZ) (for the ink intended for the deposition of the active layer).

The depositions are carried out by the dip coating technique.

The deposition of a layer of the sol-gel solution obtained in sub-section 1.1, solution concentrated to 0.2 M in n-propanol, is carried out by dip coating of the substrate at a rate of 1 cm·min$^{-1}$ for 1 minute.

The substrate thereby coated is then subjected, again, to a dip coating in the dispersion prepared in sub-section 1.2. at a rate of 1 cm·min$^{-1}$ for 1 minute (a test with the dispersion at 56% and a test with the dispersion at 51%).

The substrate thereby obtained is then dried at ambient temperature for 5 minutes then calcinated in the oven (150° C.) for 10 minutes.

The substrate is then subjected to a densification heat treatment under load (yttriated zirconia 8YSZ foams), in an oven, comprising the following successive steps:
- starting from ambient temperature, a temperature gradient of 120° C./h until the temperature of 700° C. is reached;
- a treatment at 700° C. for 2 hours;
- a temperature gradient of 120° C./h until the temperature of 1400° C. is reached;
- a treatment at 1400° C. for 10 hours; and
- a temperature gradient of −120° C./h until ambient temperature is reached.

At the end of this heat treatment, the assembly obtained comprises:
- the aforementioned substrate;
- a dense material covering the first face of the substrate, being in the form of a film stemming from the heat treatment of the first layer deposited and the second layer deposited.

At the end of the heat treatment, a current collector layer based on nickel(II) oxide (NiO) (18 µm) is deposited by serigraphy, from an ink, on a second face of said support opposite said first face, said ink being formed from a commercially available powder of NiO (for the ink intended for the deposition of the current collector layer) and of a dispersant of phosphate-ester type (for example, CP213®) (according to a proportion of 1.5% by mass with respect to the mass of powder).

1.4. Measurement of the Thickness of the Deposited Layers.

The film thickness obtained as a function of the dispersion used is measured by scanning microscopy. The results are reported in Table 1 below.

TABLE 1

| Mass percent of commercially available ceramic powder of composition $ZrO_2$-8 mol % $Y_2O_3$ in the dispersion (%) | Thickness of deposited layers (μm) |
|---|---|
| 51 | 8 |
| 56 | 20 |

A dependency link between the film thickness and the mass percent of commercially available ceramic powder, of composition $ZrO_2$-8 mol % $Y_2O_3$, in the dispersion, may be established. This thickness increases with higher mass percent.

These measurements show that the variation of this percentage makes it possible to control the viscosity of the dispersion, and thus, the thickness of the layers deposited on the substrate.

Example 2

This example illustrates the preparation of a material based on metal element(s) oxide(s) on a NiO-YSZ substrate according to the method of the invention.

To do so, the following steps are carried out:
 the preparation, in aqueous medium, of a sol-gel precursor solution of a ceramic of composition $ZrO_2$-8 mol % $Y_2O_3$ (sub-section 2.1);
 the preparation of a dispersion comprising a commercially available ceramic powder of composition $ZrO_2$-8 mol % $Y_2O_3$, and a sol-gel solution as defined above (sub-section 2.2);
 successive depositions of said sol-gel solution and of said dispersion on the substrate followed by a heat treatment (sub-section 2.3).

2.1. Preparation of a Stable Sol-Gel Precursor Solution of a Ceramic Oxide YSZ of Composition $ZrO_2$-8 mol % $Y_2O_3$ in Water.

In this part, the preparation of a precursor solution of ceramic YSZ of composition $ZrO_2$-8 mol % $Y_2O_3$ in water, from a zirconium precursor, introduced in the form of an oxychloride, and from a yttrium precursor, introduced in the form of a chloride, is illustrated.

The zirconium oxychloride used is $ZrOCl_2 \cdot 8H_2O$ (99.5% supplied by Merck) (also known as octahydrated zirconium oxychloride) and the yttrium chloride used is $YCl_3 \cdot 6H_2O$ (99.99% supplied by Aldrich) (also known as hexahydrated yttrium chloride).

Octahydrated zirconium oxychloride (75 g) and hexahydrated yttrium chloride (11.2 g) are dissolved in water (140 mL), while respecting a $[YCl_3 \cdot 6H_2O]/[ZrOCl_2 \cdot 8H_2O]$ ratio=8/92, so as to form oxide $ZrO_2$-8% mol. $Y_2O_3$. Urea (20 g) is added to the solution to favour the precipitation of the particles of YSZ, in the following proportions with respect to the zirconium salt: $[urea]/[ZrOCl_2 \cdot 8H_2O] = 1.4$.

The mixture is introduced into a glass recipient then into an autoclave heated under pressure, to a temperature of 180° C. (corresponding pressure: 18 bars) for 4 hours. A white precipitate of YSZ then forms in the autoclave, which is separated from the supernatant by centrifugation, cleaned by a succession of dialyses in distilled water, in order to eliminate the salts still present, before being diluted in water to obtain the desired concentration.

A step of stabilisation of the sol-gel solution by peptisation to a pH of 2 in the presence of hydrochloric acid 37% in aqueous solution follows. A final step of sonification, carried out for several hours using sonotrodes, enables a sol-gel solution of composition $ZrO_2$-8 mol % $Y_2O_3$ to be obtained. In this example, photographs taken by transmission electron microscopy (TEM) reveal that crystallised nanoparticles of YSZ of size comprised between 5 and 10 nm are obtained.

2.2. Preparation of the Dispersion in Water.

In this part, the preparation in aqueous medium, of the aforementioned dispersion is illustrated.

To the sol-gel solution prepared according to 2.1 (271 mL) is added a commercially available ceramic powder of composition $ZrO_2$-8 mol % $Y_2O_2$ (supplied by Tosoh under the denomination TS-8YS) (500 g), whereupon a dispersion comprising 21% by mass of sol-gel solution is obtained.

Ethylene glycol (ethane-1,2-diol) (supplied by Sigma-Aldrich) (5% by mass of the dispersion) (37 mL) is added to the dispersion to adjust the viscosity of the mixture. A polyether derivative of formula (I) explained previously (Triton® X-100, 0.5% by mass of the dispersion) (supplied by Sigma-Aldrich) (4.1 g), is then added to the mixture to avoid the agglomeration of the different constituents of the mixture.

The dispersion obtained is then placed under stirring at ambient temperature.

The mass ratio of commercially available powder/nanoparticles is set at 90/10.

2.3. Deposition of the Sol-Gel Solution and of the Dispersion Prepared in Water.

In this part are illustrated the steps of deposition on support of the sol-gel solution and of the dispersion prepared in water, according to the protocols of sub-sections 2.1. and 2.2 followed by a heat treatment.

A prior step of preparation of the supports, the protocol of which is identical to that described in sub-section 1.3., is carried out.

The depositions are carried out by the dip coating technique. The deposition of a layer of the sol-gel solution obtained in sub-section 2.1., the concentration effects of which will be studied in sub-section 2.4., is carried out by dip coating of the substrate at a rate of 1 cm·min$^{-1}$ for 1 minute.

The protocols of dip coating the substrate in the dispersion prepared in aqueous medium according to sub-section 2.2., as well as those of heat treatment, are identical to those implemented in sub-section 1.3.

At the end of said heat treatment, the assembly obtained comprises:
 the aforementioned substrate;
 a dense material covering the first face of the substrate, being in the form of a film stemming from the heat treatment of the first layer deposited and of the second layer deposited.

2.4. Measurement of the Thickness of the Deposited Layers.

The film thickness obtained as a function of the dispersion used is measured by scanning microscopy.

The results are recorded in Table 2 below.

TABLE 2

| Volume percent of water in the dispersion (%) | Thickness of the deposited layers (μm) |
|---|---|
| 65 | 10 |
| 35 | 32 |

A dependency link between the thickness of the deposited layers and the volume percent of water in the dispersion may be established. This thickness increases with lower volume percent.

These measurements show that the variation of this percentage, by dilution of the dispersion with water, or conversely by concentration thereof, makes it possible to control the viscosity of said dispersion, and thus, the thickness of the layers deposited on the substrate. The layers prepared are dense, homogeneous in thickness and not having fissures.

The invention claimed is:

1. A method for preparing a material based on oxide(s) of metal element(s) on a substrate, said substrate composed of non-sintered powder(s) of metal element(s) oxide(s), comprising the following successive steps:
   a) depositing, by liquid deposition, on at least one face of said substrate, at least one layer of a first sol-gel precursor solution of the constituent metal element(s) oxide(s) of said material, wherein said first sol-gel precursor solution does not comprise a powder;
   b) depositing, by liquid deposition, on said layer deposited in a), at least one layer of a dispersion comprising a powder of metal element(s) oxide(s) and a second sol-gel solution identical to or different from that used in step a), said second solution being a precursor of the constituent metal element(s) oxide(s) of said material and the powder consisting of constituent metal element(s) oxide(s) of said material;
   c) heat treating said layers deposited in a) and b) in order to transform them into said material.

2. The method of claim 1, in which the material based on metal element(s) oxide(s) is a material based on oxide(s) of transition metals and/or lanthanide(s).

3. The method of claim 1, in which the material based on metal element(s) oxide(s) is based on oxide(s) selected from cerium and gadolinium oxide, cerium oxide, zirconia doped with yttrium (YSZ), zirconia doped with scandium and apatite oxides.

4. The method of claim 1, in which the substrate is made of one or more metal element(s) oxide(s) of composition identical to the material prepared according to the method of claim 1.

5. The method of claim 1, in which the substrate is made of zirconia doped with yttrium (YSZ), optionally mixed with nickel oxide NiO.

6. The method of claim 5, wherein the substrate is made of zirconia doped with yttrium (YSZ) mixed with nickel oxide NiO.

7. The method of claim 1, in which said first sol-gel solution of step a) is a sol-gel solution of colloidal type.

8. The method of claim 1, in which step a) is carried out by dip coating.

9. The method of claim 1, further comprising, before step a), a step of preparing the first sol-gel solution used in step a).

10. The method of claim 9, in which the first sol-gel solution is prepared from metallic molecular precursors added to a medium comprising an organic or aqueous solvent.

11. The method of claim 9, in which, when the first sol-gel solution is a precursor of zirconia doped with yttrium (YSZ), the first sol-gel solution is prepared by placing in contact a yttrium based molecular precursor and a zirconium based molecular precursor with at least one alcoholic solvent.

12. The method of claim 11, in which the zirconium based molecular precursor is zirconium iso-propoxide.

13. The method of claim 11, in which the yttrium based molecular precursor is hexahydrated yttrium nitrate.

14. The method of claim 9, in which, when the first sol-gel solution is a zirconia precursor doped with yttrium (YSZ), the first sol-gel solution is prepared by placing in contact a yttrium based molecular precursor and zirconium based molecular precursor in an aqueous solvent.

15. The method of claim 14, in which the zirconium based molecular precursor is octahydrated zirconium oxychloride.

16. The method of claim 14, in which the yttrium based molecular precursor is hexahydrated yttrium chloride.

17. The method of claim 1, in which the second sol-gel solution comprised in the dispersion of step b) is identical to the first sol-gel solution of step a).

18. The method of claim 1, in which step b) is carried out by dip coating.

19. The method of claim 1, further comprising a step of preparing the dispersion used in step b).

20. The method of claim 1, in which the dispersion is prepared by suspending a powder of metal element(s) oxide(s) in a first sol-gel solution as defined in step a).

21. The method of claim 1, in which the material is in the form of a film having a thickness ranging from 1 to 20 μm.

22. The method of claim 1, in which the material formed on the substrate is an electrode-electrolyte assembly for SOFC cell.

23. The method of claim 1, wherein the substrate is obtained by serigraphy or by a tape casting method.

* * * * *